US004001567B2

United States Statutory Invention Registration [19]

[11] Reg. Number: H1567

[45] Published: Aug. 6, 1996

Parsons et al.

[54] TRANSPARENT CERAMIC ARMOR

[75] Inventors: Gordon R. Parsons, Everett; Fred E. Mooney, Harvard, both of Mass.

[73] Assignee: The United States of America as represented by the Secretary of the Army, Washington, D.C.

[21] Appl. No.: 667,624

[22] Filed: Sep. 7, 1967

[51] Int. Cl.[6] ..... F41H 5/26

[52] U.S. Cl. ..... 89/36.02; 428/911; 501/153

[58] Field of Search ..... 89/36, 36 A, 36.5, 89/36.01, 36.02, 36.11; 106/62; 109/10–19, 49.5, 78–80, 84; 161/404; 501/153; 428/412, 911

[56] References Cited

U.S. PATENT DOCUMENTS

| | | | |
|---|---|---|---|
| 1,223,135 | 4/1917 | Bardin | 89/36 A X |
| 1,423,652 | 7/1922 | Edmondson | 89/36 A X |
| 3,083,123 | 3/1963 | Navias | 427/162 |
| 3,516,839 | 6/1970 | Bruch | 501/153 |
| 3,634,177 | 1/1972 | Glaser | 89/36.02 |

*Primary Examiner*—Stephen C. Bentley
*Attorney, Agent, or Firm*—Freda L. Krosnick; Muzio B. Roberto; Frank J. Dynda

[57] ABSTRACT

A transparent composite armor providing complete protection for small arms projectiles up to and including caliber .50 AP M2 projectiles consisting of two or more layers of transparent material having a hard frangible face plate backed by one or more tough resilient plates to absorb the excess impact force after contact with the face plate, the several plates being bonded together with a suitable transparent adhesive.

5 Claims, 1 Drawing Sheet

Figure 1:
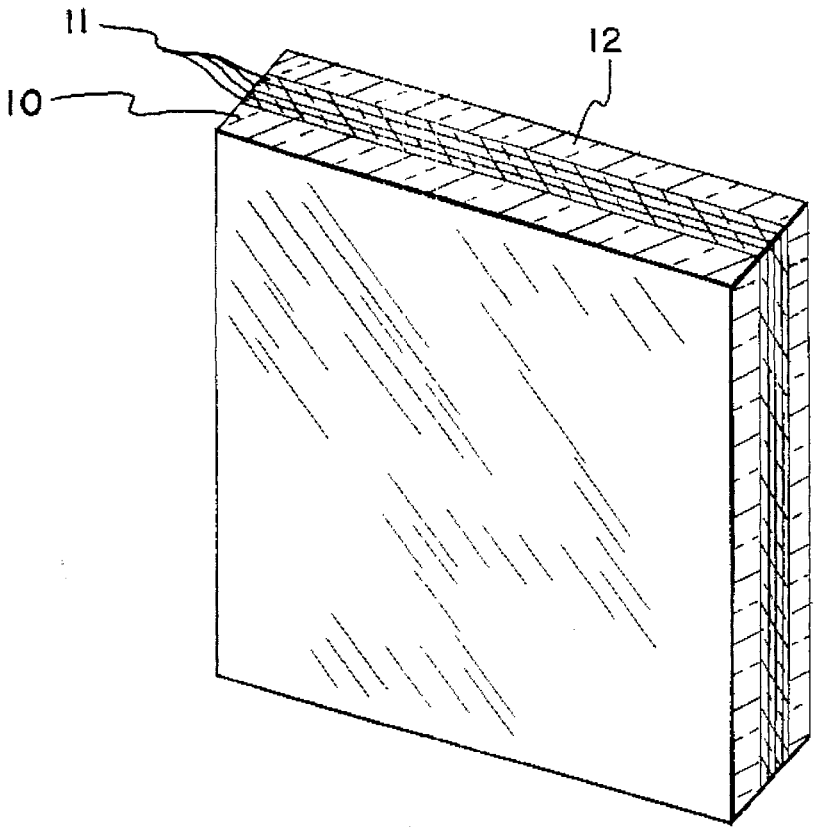

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSPARENT CERAMIC ARMOR

The invention described herein may be manufactured, used, and licensed by or for the Government for governmental purposes without the payment to me of any royalty thereon.

BACKGROUND

Heretofore, significant advances in transparent armor have been attained by the geometrical arrangement of commercially available materials such as hard glasses, chemically-tempered glasses, thermoset biaxially stretched acrylics, polycarbonates, etc. Utilizing these material composites with areal densities of 10 to 11 pounds have attained merit ratings of about 1.40 against caliber .30 BALL M2 projectiles at 0° obliquity, while, caliber 30 AP M2 projectiles have been defeated at 0° obliquity utilizing these materials with areal densities of approximately 20 lbs to show merit ratings of 1.10 to 1.36. These composites have areal densities which are unacceptable to military requirements, particularly for aircraft applications, and for that reason have not been incorporated in armor systems. Further, transparent composites that defeat caliber .50 BALL M2 and AP M2 projectiles are nonexistent, yet non-combat vehicles are increasingly subjected to these threats.

Present day combat has necessitated a change in tactics to cope with guerilla warfare and has resulted in stringent requirements affecting the design of air and land vehicles. Non-combat vehicles are often subjected to spasmodic combat conditions and thus now receive armor considerations. The role of the helicopter as a combat vehicle has stimulated concern of its vulunerability to small arms fire, which includes engines, fuel tanks, gear drives and crew personnel. With mobility being a prime requisite for the present day army, the ability to navigate, which depends on visibility becomes increasingly important. Yet, the development of suitable and efficient transparent protective material lags greatly behind that of opaque armor.

However, nearly all transparent materials have been deficient in that they have only a limited capability for inducing fracture of small arms armorpiercing projectiles, which is the criterion in determining favorable ballistic performance. Attempts to obtain stress-wave reinforcement of stresses in the projectile by variation of composite glass frontal layer thickness have been singularly unsuccessful. It appears that available glasses do not have sufficient strength or modulus to induce high amplitude stress pulses in the projectiles.

It is therefore, the object of this invention to provide a transparent composite (ceramic-glass-plastic), capable of defeating caliber .30 AP M2 projectiles at 0° obliquity, with 8 to 10 pounds areal density and caliber .50 AP M2 projectiles with an areal density of 18–20 pounds, which would not only decrease the vulnerability of vehicles of all types but would establish a technological milestone in the field of transparent armor.

The means, by which the selection of materials by properties and proper geometric arrangement for maximum ballistic protection, are the result of intensive investigation of the pressure wave transfer through ceramic composites impacted by steel cored projectiles. Theoretical and experimental conclusions indicate the fundamental material properties, modulus of elasticity and density, are favorable to ballistic protection when a high elastic modulus and low density facing material is utilized ia conjunction with a low elastic modulus and low density back-up material.

Expressions employed herein are defined as follows:
Areal density: armor weight expressed in pounds per square foot of surface area $$\text{Merit rating}: \frac{\text{Ballistic limit of Experimental Armor}}{\text{Ballistic limit of Standard Steel Armor}}$$

where both the experimental and standard armors have the same areal density (lbs./sq. ft.)

AP: armor piercing $V_{50}$ penetration: is a term used to indicate that there is a 50:50 chance of penetration Elastic Modulus: is the ratio of stress to strain within the elastic range of a particular material and the elastic range is the limit to which a particular material may be subjected and still return to its original form or shape.

This invention attains its stated object by the formation of a transparent composite consisting of a single ply transparent ceramic face plate,since the required property of high elastic modulus is more characteristic of ceramics than glass, and also of low density with the general overall characteristic of being relatively hard and brittle, while thee transparent back-up layer or layers is of low elastic moduli, of low density and also of relatively tough resilient material. The face plate and the back-up plate of one or more layers are bonded together by any suitable transparent adhesive to form the desired composite.

Figure 2:
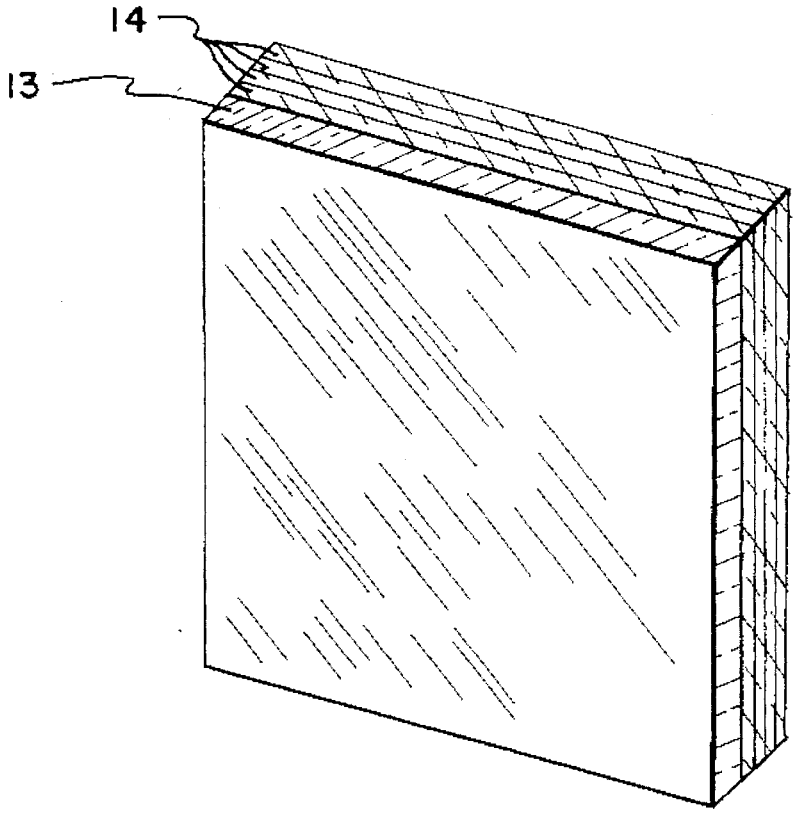

Variations of the composite are illustrated in the drawing in which:

FIG. 1 is a perspective view in section of a three layered transparent composite and FIG. 2 is a similar view in section of the composite utilizing two layers.

The transparent composite shown in FIG. 1 consists of a front face 10 of spinel plate (by weight substantially 71.5% AL203.28,5% MgO) with a thickness of ⅜", an intermediate layer 11 of sheets of polysulfone or other suitable transparent plastic material of ⅛"hot pressed together to form a tough resilient layer with a thickness of ½" and a ¼" back layer 12 of polycarbonate known under the trade name of "Lexan" which is even more resilient than intermediate layer. When the layers are assembled, the face plate 10 is bonded to the intermediate layer 11 with a 0.0250" sheet of polyvinyl butyral and the back layer 12 is bonded to the layer 11 with a suitable cellulose acetate pressure sensitive adhesive and the configuration is subjected to heat and pressure to form the composite shown. It should be noted that the plates as well as the bonding means are all transparent. It is essential that the ceramic face plate be of high elastic modulus and that the modulus of elasticity decreases from front to back in the composite with the back-plate being of low elastic modulus and all three layers being of as low a density as compatible with the aim of ballistic protection, because the other result sought is that the composite be light enough to be utilized on airborne vehicles. This composite varies in thickness from 1" to 1½" and will defeat small arms ammunition up through and including caliber .30 AP M2 projectiles.

FIG. 2 shows a light weight transparent composite for defeating all small arms ammunition up through and including caliber .50 AP M2 projectiles, wherein the ½" face plate 13 may be spinel plate, of the composition set forth above and the back-up layer or layers 14 with an overall thickness of 1" to 1¼" and which may be made up singly or several combinations as interlayers or laminated sheets of the same material or cast in place. This back-up layer 14 as in the composite in FIG. 1, should be of low elastic modulus and of low density. The back-up layer or plate 14 may be composed of various transparent thermoplastic or thermosetting composition selected from the following.

Acrylonitrile-butadiene-styrene (BS)
Acetal resins
Cellulose acetate
Cellulose acetate butyrate
Cellulose acetate propionate
Acrylics and modified acrylics
Allyl resins
Cellulose triacetate
Chlorinated polyethers
Ethyl cellulose
Epoxy-rigid and flexible
Fluoroplastics
Ionomers-"Surlyn A" (DuPont trade mark)
Melamines
Nylons
Parylene polymers
Phenolics transparent (thermosetting)
Phenoxy resins
Polybutylene
Polycarbonates
Polyesters
Polyethylenes
Polyphenylene
Polypropylene
Polystyrene
Polyurethanes (thermoplastic and thermosetting)
Polysulphone
Polyvinyl alcohol
Polyvinyl fluoride
Polyvinyl butyral
Polyvinylidene chloride
Silicones
Styrene-acrylonitride
Styrene -butadiene The ballistic protection afforded by these composites from experimental test data are as follows.

Projectile—caliber .30 AP M2
Obliquity—0°
Areal Density—12 lbs/ft$^2$
Ballistic Limit—2930 ft/sec for $V_{50}$ penetration
Merit Rating—1.65

The thickness of each component and subsequently the entire composite will vary according to the specific materials utilized and the type of projectiles the armor is designed to defeat. In general, the composite thickness should vary between 1" and 1¼" for defeating caliber .30 AP M2 projectiles and between 1½" to 1¾ to defeat caliber .50 AP M2 projectiles.

The areal density of these composites should vary from 8 to 10 pounds for defeating caliber .30 AP M2 projectiles at 0° obliquity and from 18 to 20 pounds for defeating caliber .50 AP M2 projectiles at 0° obliquity.

The transparent adhesive employed in effectively bonding the laminae together are readily available from various manufacturers. The bonding adhesive is applied in a manner well known in the art and is followed by curing at elevated temperatures and pressures which will vary according to the type of resin employed.

In the foregoing, the preferred embodiment of this invention has been disclosed. However, it is not intended that this invention be so limited to the specific examples set forth above, as it will be apparent to those skilled in the art, that the ingredients may be varied and a variety of equivalent substances may be employed without departing from the spirit of the invention or exceeding the scope of the appended claims.

We claim:

1. A transparent light weight armor affording complete ballistic protection against small arms ammunition up to and including caliber .30 AP M2 projectiles comprising, a light weight composite having a hard shatterable transparent ceramic face plate containing by weight substantially 71.5% aluminum oxide and 28.5% magnesium oxide with a high elastic modulus and a low density, a transparent intermediate laminated layer of polysulfone sheets hot pressed to form a tough resilient unitary plate of low density and of lower elastic modulus than the face plate, a back-up layer of even greater toughness and resiliency than intermediate layer being a single sheet of polycarbonate of low density and even lower elastic modulus than said intermediate layer, the several layers bonded by heat and pressure to each other with a transparent adhesive so constructed and arranged to form a low density composite with the elastic modulus of the several layers decreasing from front to back and the resiliency increasing in the same direction.

2. A transparent light weight armor affording complete ballistic protection against small arms ammunition up to and including caliber .30 AP M2 projectiles having a muzzle velocity of 2770 feet per second comprising, a light weight composite having a hard shatterable ceramic face plate containing by weight substantially 71.5% aluminum oxide and 28.5% magnesium oxide, said face plate being a single ply ⅜" thick with a high elastic modulus and a low density secured by a 0.0250" sheet of polyvinyl butyral to a transparent laminated intermediate layer of polysulfone sheets hot pressed to form a tough resilient unitary layer, said intermediate layer having a thickness of ½" with a low elastic modulus and a low density and a ¼" back-up layer of greater resiliency than intermediate layer being a single ply transparent sheet of polycarbonate of even lower elastic modulus, low density and greater resiliency than said intermediate layer, said back-up layer being held to the intermediate layer with transparent adhesive the several layers bonded together by heat and pressure so constructed and arranged as to provide a low density transparent composite armor with an overall thickness of substantially 1⅛" having an areal density of substantially 12 pounds per square foot with the elastic modulus decreasing from front to back and the resiliency increasing in the same direction capable of defeating small arms ammunition up to a $V_{50}$ penetration of 2930 feet per sec. and with a merit rating of 1.65 as compared to standard steel armor of equal areal density.

3. A transparent lightweight composite armor comprising a transparent ceramic face plate of high elastic modulus and low density bonded by a transparent adhesive to a transparent laminated plastic back-up plate of low elastic modulus and low density, the face plate comprising a spinel composed of a transparent mixture of aluminum oxide and magnesium oxide, the composite armor being so constructed and arranged as to afford complete ballistic protection from small arms ammunition up to and including caliber .50 AP M2 projectiles.

4. Transparent ceramic armor as defined in claim 3 wherein the face plate has a thickness of substantially one-half inch, the back-up plate has a thickness of substantially one and one-quarter inches, and the overall composite armor has an areal density of substantially 18 to 20 pounds per square foot.

5. A transparent lightweight armor comprising a ceramic face plate formed from a transparent mixture of aluminum oxide and magnesium oxide, bonded by a transparent adhesive to a transparent plastic back-up plate, the face plate having a thickness of substantially three-eights of an inch, the plastic back-up plate having a thickness of substantially three-quarters of an inch, and the composite armor having an areal density of substantially twelve pounds per square foot and being so constructed and arranged as to afford complete ballistic protection from small arms ammunition up to and including caliber .30 AP M2 projectiles.

* * * * *